United States Patent
Mukkara et al.

(10) Patent No.: US 8,799,640 B2
(45) Date of Patent: Aug. 5, 2014

(54) TECHNIQUES FOR MANAGING A SECURE COMMUNICATION SESSION

(75) Inventors: Prakash Umasankar Mukkara, Bangalore (IN); Lloyd Leon Burch, Payson, UT (US)

(73) Assignee: Novell, Inc., Provo, UT (US)

( * ) Notice: Subject to any disclaimer, the term of this patent is extended or adjusted under 35 U.S.C. 154(b) by 457 days.

(21) Appl. No.: 12/714,451

(22) Filed: Feb. 27, 2010

(65) Prior Publication Data

US 2011/0213956 A1 Sep. 1, 2011

(51) Int. Cl.
*H04L 29/06* (2006.01)
*G06F 9/00* (2006.01)

(52) U.S. Cl.
USPC ............... 713/152; 713/158; 726/21; 726/15

(58) Field of Classification Search
USPC ................. 713/152–158; 726/2–21; 380/255
See application file for complete search history.

(56) References Cited

U.S. PATENT DOCUMENTS

| | | | |
|---|---|---|---|
| 7,032,110 B1 * | 4/2006 | Su et al. | 713/156 |
| 7,065,507 B2 * | 6/2006 | Mohammed et al. | 705/59 |
| 7,631,084 B2 * | 12/2009 | Thomas et al. | 709/227 |
| 7,930,732 B2 * | 4/2011 | Kumar et al. | 726/4 |
| 8,090,877 B2 * | 1/2012 | Agarwal et al. | 709/246 |
| 2007/0245409 A1 | 10/2007 | Harris et al. | |
| 2009/0025080 A1 | 1/2009 | Lund et al. | |
| 2009/0037998 A1 | 2/2009 | Adhya et al. | |
| 2009/0199285 A1 | 8/2009 | Agarwal et al. | |

OTHER PUBLICATIONS

Juniper Networks Secure Access Administration Guide, Release 5.5 Writers: Paul Battaglia, Gary Beichler, Claudette Hobbart, Mark Smallwood Editor: Claudette Hobbart Copyright © 2006, Juniper Networks, Inc. Part No. 55A031207 http://www.juniper.net/techpubs/software/ive/admin/5.5-IVEAdminGuide.pdf.*
Java WS Core (Developer's Guide, Draft, Jul. 2008).*

\* cited by examiner

*Primary Examiner* — Zachary A. Davis
*Assistant Examiner* — Oleg Korsak
(74) *Attorney, Agent, or Firm* — Schwegman, Lundberg & Woessner, P.A.

(57) ABSTRACT

Techniques for managing a secure communication session are provided. A non-browser application utilizes a browser to establish a secure communication session with a server. The session cookie set in the browser is mapped by the server to a secret token that is supplied via the browser to the non-browser application. The browser is then closed and the secure communication session between the server and the non-browser application continues unabated via the secret token.

20 Claims, 4 Drawing Sheets

TECHNIQUES FOR MANAGING A SECURE COMMUNICATION SESSION

BACKGROUND

The web browser is the most ubiquitous and common application that exists today for communicating. Because of this reason, many Identity systems have developed their authentication model assuming the web browser to be their application that initiates authentication. Also, web browser cookies are the most common form of holding the identity of a session that is authenticated.

As long as the cookie is alive at the browser, the authentication at the server is alive and the communication channels that depend on this authenticated session continue to perform their activities. A lot of authentication providers require the web browser to be the application requesting authentication because of the usage of info cards, smartcards, BasicAuth, need for running Java Server Pages (JSPs), JavaScripts and many other browser features.

However, for certain non-web based applications (such as a Secure Socket Layer (SSL) Virtual Private Network (VPN)), keeping the browser open and alive may be annoying and users prefer to close the browser after authentication is done. This kind of a non-web application uses the server's web interface to gain authentication and access policy information. Users may also close the browser accidentally resulting in un-wanted disconnection of their non-web application. Also, the web browsers generally cannot be minimized to the system tray area.

SUMMARY

In various embodiments, techniques for managing a secure communication session are presented. More specifically, and in an embodiment, a method for managing a secure communication session is provided. A request for a secure communication session is detected; the secure communication session between a non-browser application and a server and the request initiated by the non-browser application. The secure communication session is established between the non-browser application and the server via a browser. Next, a session cookie that the browser uses with the secure communication session is mapped to a secure token and this secure token is transferred to the non-browser application in a secure fashion via the browser. Finally, the secure communication session is maintained after the browser is shut down by translating the secure token supplied by the non-browser application into the session cookie expected by the server for the secure communication session.

DETAILED DESCRIPTION

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "non-browser application" is a software service, system, and/or module that does not rely on and is not implemented within a browser. The non-browser application includes a web interface to interact with and communicate with a browser but does not require a browser and is not embedded within a browser.

Various embodiments of this invention can be implemented in existing network architectures. For example, in some embodiments, the techniques presented herein are implemented in whole or in part in the Novell® operating system products, access management products, directory-based products and other products distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within computer-readable storage media and processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of FIGS. 1-4.

Figure 1:
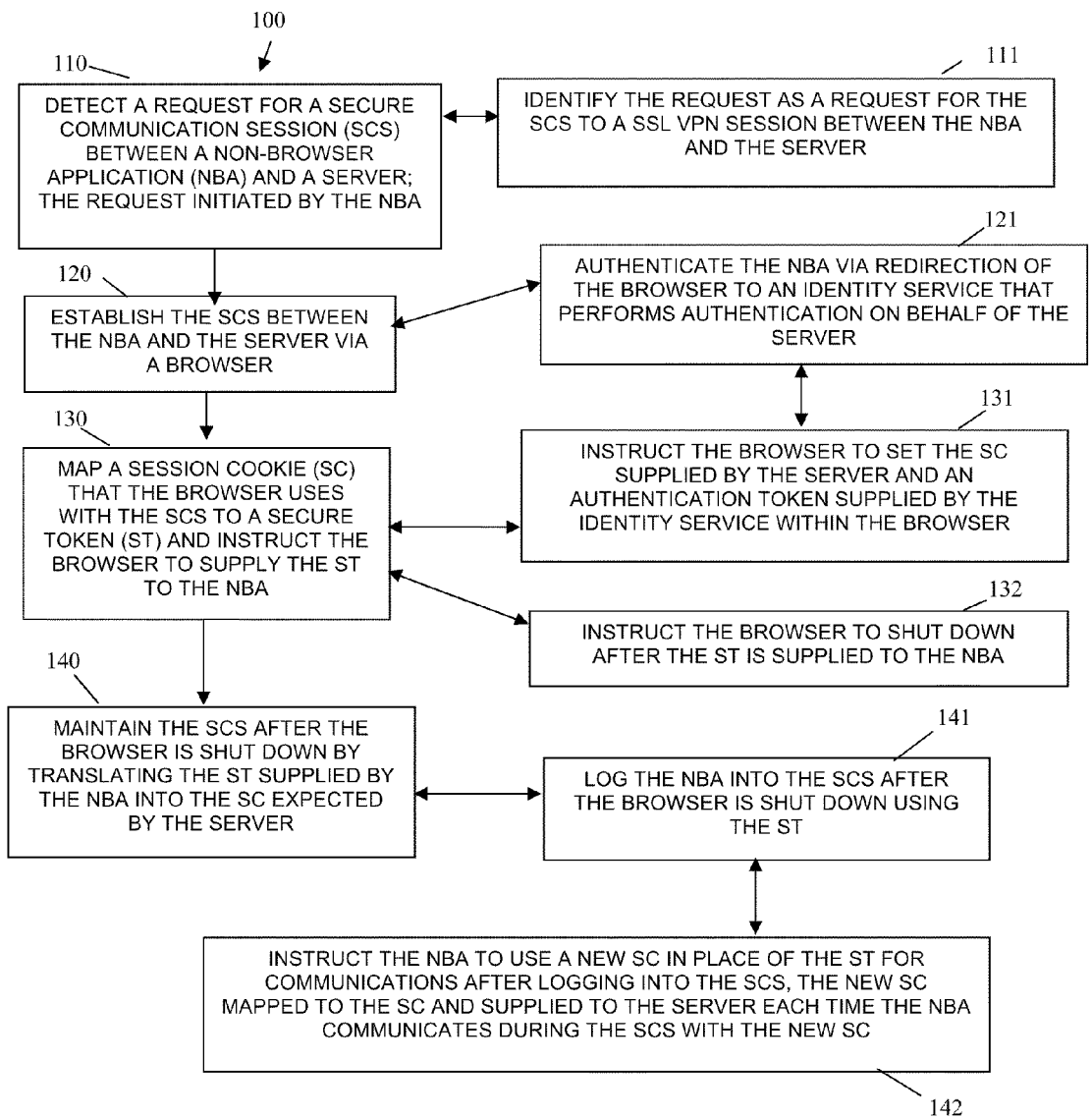
FIG. 1 is a diagram of a method for managing a secure communication session, according to an example embodiment.

FIG. 1 is a diagram of a method 100 for managing a secure communication session, according to an example embodiment. The method 100 (hereinafter "server communication service") is implemented in a machine-accessible and computer-readable medium and instructions that execute on one or more processors (machines, computers, processors, etc.). The machine, such as a server, is specifically configured to process the server communication service. Furthermore, the server communication service is operational over and processes within a network. The network may be wired, wireless, or a combination of wired and wireless.

According to an embodiment, the server communication service represents processing for a Secure Socket Layer (SSL) Virtual Private Network (VPN) (referred to as an SSL VPN) performed by a server.

At 110, the server communication service detects a request for a secure communication session between a non-browser application and a server. The request is initiated by the non-browser application. A secure communication session is an authenticated communication session that can use encryption.

For example, at 111, the server communication service identifies the request as a request for the secure communication session to a SSL VPN between the non-browser application and the server.

At 120, the server communication service establishes the secure communication session between the non-browser application and the server via a browser. That is, a browser is used as an intermediary to initially establish the secure communication session. However, conventionally the browser needed to stay alive and active during the session between the non-browser application and the server; that is not the case with the techniques presented herein and below (as described more completely below).

According to an embodiment, at 121, the server communication service authenticates the non-browser application via redirection of the browser to an identity service. The identity service performs authentication on behalf of the server. So, the server offloads authentication to a third-party, such as an identity service. The identity service is used to authenticate the non-browser application or a user of the non-browser application for access to the secure communication session and correspondingly the server.

At 130, the server communication service maps a session cookie that the browser uses with the secure communication session to a secure token and then the server communication service instructs the browser to supply the secure token to the non-browser application.

In an embodiment, at 131 and continuing with the embodiment of 121, the server communication service instructs the browser to set the session cookie supplied by the server and an authentication token supplied by the identity service within the browser. These can be set as two distinct cookies (a more complete explanation of this scenario is described in detail below with reference to the FIG. 4).

In a scenario, at 132 and after the browser supplies the token to the non browser application, the server communication service instructs the browser to shut down and close; again, this is after the secure token is supplied or successfully provided to the non-browser application.

At 140, the server communication service maintains the secure communication session after the browser is shut down or closed. This is done by the server communication service translating the secure token supplied by the non-browser application into the session cookie expected by the server. So, the server maintains and recognizes the session cookie but the browser closed at this point in time. So, the server communication service maintains the session cookie and its mapping to the secure token and when the secure token is supplied by the non-browser application, the server communication service translates the secure token to the session cookie and provides that to the server so the secure communication session continues unabated even without the presence of the browser. This can also be done by re-forming the secure communication session with the session cookie. Conventionally, this could not be achieved as the browser had to remain active to supply the session cookie or the secure session was lost.

According to an embodiment, at 141, the server communication service logs the non-browser application into the secure communication session after the browser is shut down using the secure token.

Continuing with the embodiment of 141 and at 142, the server communication service instructs the non-browser application to use a new session cookie in place of the secure token for communications after logging into the secure communication session. The new session cookie mapped to the original session cookie and the new session cookie supplied to the server each time the non-browser application communicates during the secure communication session with the new session cookie.

Figure 2:
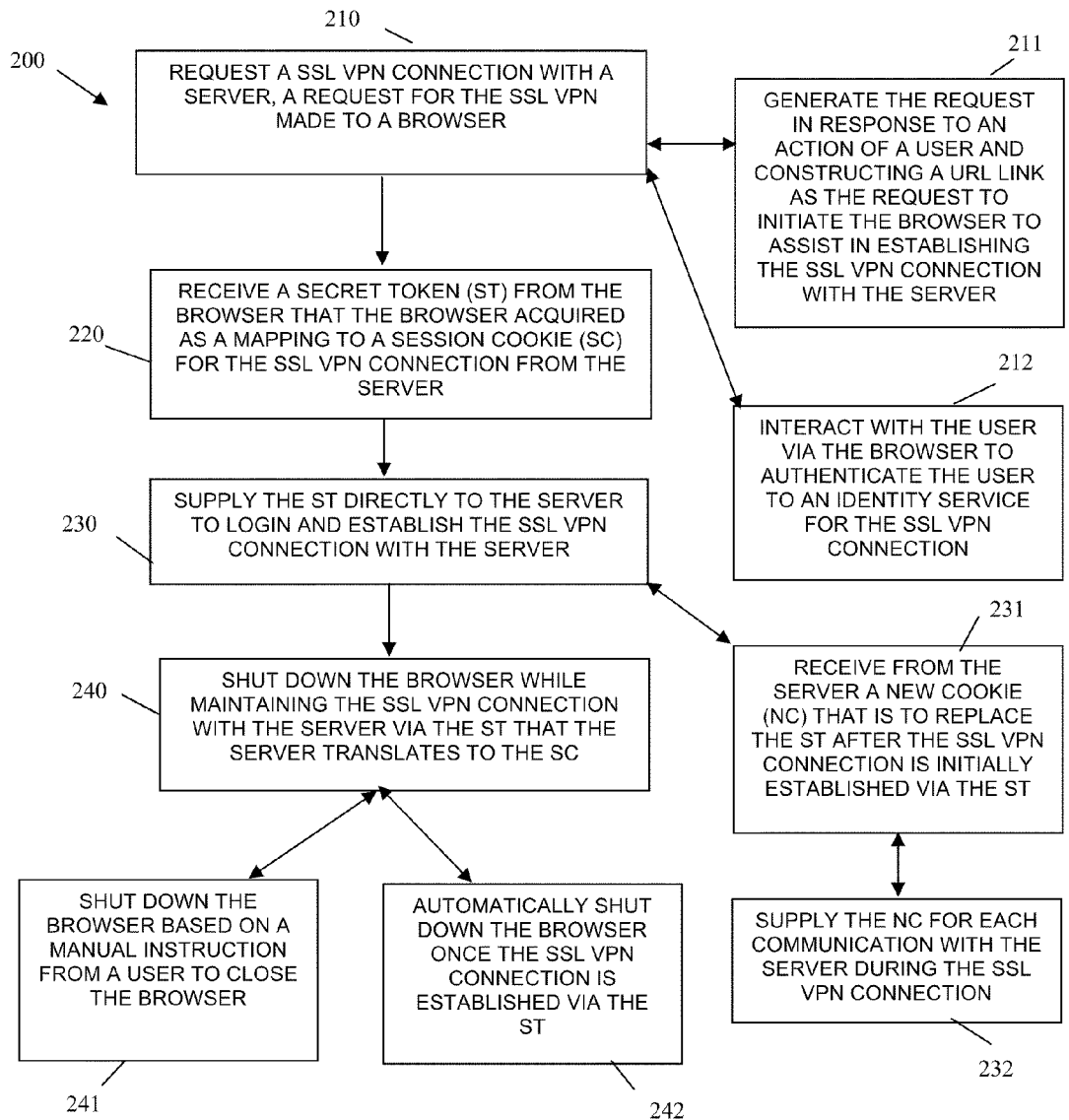
FIG. 2 is a diagram of another method for dynamically managing a secure communication session, according to an example embodiment.

FIG. 2 is a diagram of another method 200 for dynamically managing a secure communication session, according to an example embodiment. The method 200 (hereinafter "client communication service") is implemented in a machine-accessible and computer-readable storage medium as instructions that execute on one or more processors of a network. The network may be wired, wireless, or a combination of wired and wireless. Furthermore, the processor, such as a client, (device having a processing instance of the client communication service) is specifically configured to process the client communication service.

The client communication service is a non-browser application. That is, the client communication service is not browser based and executes independent of a browser.

The server communication service represented by the method 100 of the FIG. 1 provides processing from the perspective of a server, whereas the client communication service represents processing that occurs on a client and that occurs outside a browser of the client.

At 210, the client communication service requests a SSL VPN connection with a server. The request for the SSL VPN connection is made to a browser or intercepted and initially handled by the browser on behalf of the client communication service.

According to an embodiment, at 211, the client communication service generates the request in response to an action of a user. That is, the user activates a request to connect to the server and in response to that an URL link is constructed as the request and the browser initiates to assist in establishing the SSL VPN connection with the server.

In another case, at 212, the client communication service interacts with a user via the browser to authenticate the user to an identity service for the SSL VPN connection.

At 220, the client communication service receives a secret token from the browser. The browser acquired the secret token as part of a mapping to a session cookie for the SSL VPN connection from the server. The details of this mapping was provided above with reference to the method 100 of the FIG. 1.

At 230, the client communication service supplies the secret token directly back to the server for purposes of initially logging into and establishing the SSL VPN connection with the server.

In an embodiment, at 231, the client communication service receives from the server a new cookie. The new cookie is to replace the secret token after the SSL VPN connection is initially established via the secure token.

Continuing with the embodiment of 231 and at 232, the client communication service supplies the new session cookie for each communication with the server during the SSL VPN connection. The method 100 of the FIG. 1 translates the new session cookie into the original session cookie to maintain the SSL VPN connection with the server for the client communication service.

At 240, the client communication service shuts down the browser while maintaining the SSL VPN connection with the service. This is done via the secure token that the server translates to the session cookie so that the SSL VPN connection remains active. So, the SSL VPN connection remains active and valid after the browser is closed or shut down and is non-operational on the client.

In one case, at 241, the client communication service shuts down the browser based on a manual instruction from the user to close the browser. So, the user may be given a notice that the user can shut the browser down if desired. The decision or action to shut the browser down rests with the user in this scenario.

In an alternative configuration, at 242, the client communication service automatically shuts down the browser once the SSL VPN connection is established via the secret token.

A profile associated with the client communication service or a user can be used to decide whether the user is given control to shut the browser or down or whether the browser is automatically shut down. It is noted that the browser does not have to be shut down but when the browser is shut down the SSL VPN connection is not lost.

Figure 3:
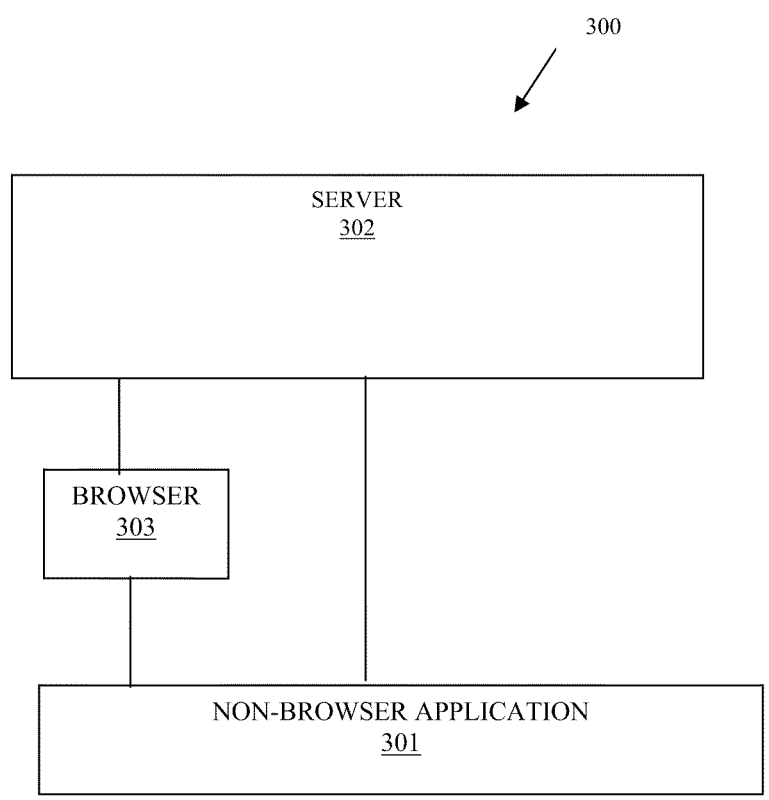
FIG. 3 is a diagram of a secure communication session management system, according to an example embodiment.

FIG. 3 is a diagram of a secure communication session management system 300, according to an example embodiment. The secure communication session management system 300 is implemented in a machine-accessible and computer-readable storage medium as instructions that execute on one or more processors (multiprocessor) and that is operational over a network. The one or more processors are specifically configured to process the components of the secure communication session management system 300. Moreover, the network may be wired, wireless, or a combination of wired and wireless. In an embodiment, the secure communication session management system 300 implements, inter alia, certain aspects of the methods 100 and 200 represented by the FIGS. 1 and 2, respectively.

The secure communication session management system 300 includes a non-browser application 301 and a server 302. Each of these and their interactions with one another will now be discussed in turn.

The non-browser application 301 is implemented in a computer-readable storage medium (non-transitory) and executes on a processor, such as a client of the network. Example processing associated with the non-browser application 301 was presented in detail above with reference to the method 200 of the FIG. 2.

The non-browser application 301 is configured to interact with a browser 303 to establish a secure communication session with the server 302 over the network.

The non-browser application 301 is also configured to resupply a secret token (discussed below) to the server 302 independent of the browser 303 or any assistance of the browser 303. This resupplied secret token initiates the secure communication session with the server 302 and the browser 303 is closed after this but the secure communication session continues and remains active between the non-browser application 301 and the server 302.

In an embodiment, the secure communication session is a SSL VPN session with a secure communication tunnel established between the non-browser application 301 and the server 302.

According to an embodiment, the non-browser application 301 is configured to close the browser 303 once the secure communication session is successfully established between the non-browser application 301 and the server 302. As noted above, the browser 303 can also be manually closed by the user at any point desired by the user and the secure communication session continues unabated.

The server 302 is configured to process over the network and interacts with the client of the non-browser application 301. Example processing associated with the server 302 was provided in detail above with reference to the method 100 of the FIG. 1. It is noted that the server 302 may also be a thick client acting as a server provider to other clients, such as the client that processes the non-browser application 301. So, the server 302 can also be a thick client.

The server 302 is configured to interact with the browser 303 to set a session cookie for the secure communication session. The server 302 is also configured to provide a secret token to the non-browser application 301 via the browser 303. The secret token maps to the session cookie and that mapping is maintained by the server 302.

According to an embodiment, the server 302 is also configured to redirect the browser 303 to an identity service to authenticate a user of the non-browser application 301 for the secure communication session.

Also, the server 302 directs the browser 303 to set the session cookie within the browser 303. This is done until the secret token is supplied and mapped by the server 302 to the session cookie in a manner that is independent of the browser 303.

In another scenario, the server 302 is configured to direct the non-browser application 301 to replace the secret token with a new session cookie after the secret token is supplied at least once from the non-browser application 301. The non-browser application 301 is then further instructed to supply the new session cookie with all subsequent communication during the secure communication session with the server 302.

Figure 4:
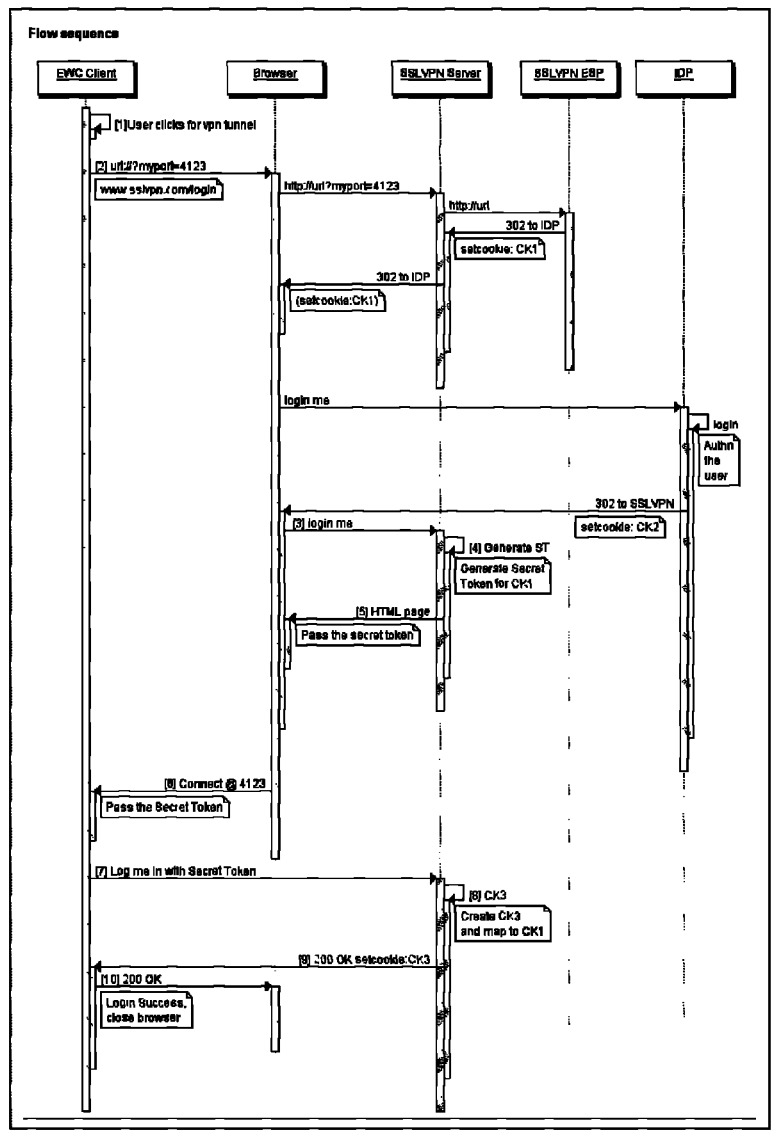
FIG. 4 is a diagram of an example flow interaction diagram for a secure communication session management system, according to an example embodiment.

FIG. 4 is a diagram of an example flow interaction diagram for a secure communication session management system, according to an example embodiment.

The user attempts to establish a secure tunnel between the workstation and the corporate server. The user is prompted to input his/her credentials and the user is authenticated. After the authentication, the secure tunnel is established and the browser is closed by the user. After closing the browser, the secure tunnel continues to operate. The processing sequence depicted in the FIG. 4 is now presented to illustrate how this processing is achieved.

1. The user wishes to establish the VPN tunnel to the server. He/she clicks the connect button on the EWC (Embedded Web Container) Client (non-browser application).

2. The details under this processing item are provided for the purpose of better understanding of the flow; other arrangements are conceivable without departing from the teachings presented herein.

The click action of the user generates an action url://www.sslvpn.com/login?myport=4123. A parameter "myport" is appended here, so that the web browser knows at what port it can connect later on to the EWC client. The operating system opens the default web browser with the URL (uniform resource locator (URL) link).

The web browser opens up the URL and connects to the SSL VPN Server. As this is not an authenticated session, SSL VPN Server, forwards the request to the SSL VPN authentication service provider (SSLVPN Embedded Authentication Service Provider (ESP)). The ESP redirects the user to the Authentication provider (IDP—identity service).

The IDP prompts the user for credentials if he/she is not authenticated already at the IDP. If browser has already been authenticated at this IDP, IDP does not force for credentials again. It performs a Single Sign On (SSO) operation and redirects the user back to the SSL VPN server.

While the above actions have happened, the following cookies are generated on the server and set on the browser:

CK1. A cookie for the SSL VPN server and SSL VPN ESP domains.

CK2. A cookie for the IDP domain.

3. The cookies CK1 (IDP) and CK2 (SSL-VPN) are set on the browser and browser goes to the SSL VPN server with CK1.

4. At this point the SSL VPN server generates a secret token (ST) and associates this secret token with cookie CK1.

5. The Hypertext Transfer Protocol (HTTP) response to the browser contains the following:
  A javascript page that can connect to the EWC on the local host, and pass the secret cookie information.
  The port at which the javascript can connect on the local host. In this example port 4123 was originally passed from the EWC client.
6. The browser loads the response, and the javascript connects to EWC @ localhost:4123 and passes the information about the secret token (ST).
7. EWC connects to the SSL VPN server and authenticates itself by presenting the secret token (ST).
8. SSL VPN Server recognizes the token and associates with the existing cookie CK1. A new cookie CK3 is generated and a new association is established at the SSL VPN server between CK1 and CK3. When ever a request comes with CK3 to the SSLVPN server, and if the server needs to communicate to SSL VPN ESP, it presents the cookie CK1 in place of CK3.
9. The SSL VPN server responds to EWC client with a 200 OK response with setcookie: CK3.
10. The EWC receives the response, establishes the VPN tunnel with the server (the process of establishing the tunnel is not in the scope of this document). After establishing the connection, it responds to the browser that the tunnel has been established. The browser displays the successful message and either it closes its self, or it displays a message that the browser can be closed.

The techniques presented herein provide a mechanism of using a browser only for cookie-based authentication and then transferring an authenticated session to a non-web browser application in a secure manner by using secure tokens. Moreover, a single authenticated session at two or more clients of a workstation can be achieved. The browser and the non-browser application can share the authentication of a single browser. A technique is also shown for securely translating the authenticated cookie into another authenticated cookie by means of a secure token in a single sign on fashion. The concept of dynamic replacement of CK3 with CK1 for all the cookie dependent applications on the SSL VPN server based on policy and secure tokens received. Even though the user started his/her authentication at a non-web browser application, if the web browser has already authenticated at the authentication provider, the user achieves a seamless single sign on at the client by reusing the browser session with an identity service. This concept itself is very unique.

It is also noted that the techniques provided herein can be applied to any e-commerce application, which is a non-web browser, where the e-commerce application is a non-web browser based (for example a native client that implements web services). The authentication provider requires the presence of web browser as the client during authentication (For selecting an info card, or for displaying JSPs and for running JavaScripts). The non-web browser e-commerce application requires the single sign on to the server, where the browser from the same workstation has already been authenticated. One such scenario can be easily seen: a user accesses some information from an e-commerce website of a corporation using the web browser (he/she authenticates to the e-commerce server). The same user starts another application (non-web browser) and attempts to connect to the same corporation; since the corporation is using a single authentication provider, SSO is achieved for the non-web browser application.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented and residing within a computer-readable storage medium that is executed by a processor of a server, the processor configured to perform the method, comprising:
  detecting, by the server, a request for a secure communication session between a non-browser application and a server; the request initiated by the non-browser application;
  establishing, by the server, the secure communication session between the non-browser application and the server via a browser, the browser acts as an intermediary to initially establish the secure communication session and the secure communication session uses encryption, wherein the browser acts as an intermediary by acquiring a secure token and supplying the secure token to the non-browser application before the browser shuts down, the non-browser application includes an interface to interact with the browser but does not require the browser and is not embedded within the browser;
  mapping, by a server, a session cookie that the browser uses with the secure communication session to the secure token and instructing the browser to supply the secure token to the non-browser application; and
  maintaining, by the server, the secure communication session after the browser is shut down by translating the secure token, by the server, into the session cookie expected by the server, wherein the secure token is supplied by the non-browser application, the server maintains the session cookie and its mapping to the secure token and when the secure token is supplied by the non-browser application, the server translates the secure token to the session cookie allowing the secure communication session to continue unabated without the presence of the browser.

2. The method of claim 1, wherein detecting further includes identifying the request as a request for the secure communication session to a secure socket layer (SSL) virtual private network (VPN) session between the non-browser application and the server.

3. The method of claim 1, wherein establishing further includes authenticating the non-browser application via redirection of the browser to an identity service that performs authentication on behalf of the server.

4. The method of claim 3, wherein mapping further includes instructing the browser to set the session cookie supplied by the server and an authentication token supplied by the identity service within the browser.

5. The method of claim 1, wherein mapping further includes instructing the browser to shut down after the secure token is supplied to the non-browser application.

6. The method of claim 1, wherein maintaining further includes logging the non-browser application into the secure communication session after the browser is shut down using the secure token.

7. The method of claim 6, wherein logging further includes instructing the non-browser application to use a new session cookie in place of the secure token for communications after logging into the secure communication session, the new session cookie mapped to the session cookie and supplied to the server each time the non-browser application communicates during the secure communication session with the new session cookie.

8. A method implemented and residing within a computer-readable storage medium that is executed by a processor of a network to perform the method on a client, comprising:
   requesting, by the client, a secure socket layer (SSL) virtual private network (VPN) connection with a server, a request for the SSL VPN made to a browser;
   receiving, by the client, a secret token from the browser that the browser acquired as a mapping to a session cookie for the SSL VPN connection from the server;
   supplying, by the client, the secret token directly to the server to login and establish the SSL VPN connection with the server, the browser acts as an intermediary to initially establish the SSL VPN connection and SSL VPN connection uses encryption, the browser acquires the secret token from the server and supplies the secret token to the client and then the browser shuts down;
   shutting down, by the client, the browser while maintaining the SSL VPN connection with the server via the secret token that the server translates to the session cookie, the server maintains the session cookie without the presence of the browser and when the browser is shut down using the secret token supplied to the server and the server dynamically translates the secret token into the session cookie; and
   processing, by the client, the method independent of the browser.

9. The method of claim 8, wherein requesting further includes generating the request in response to an action of a user and constructing a uniform resource locator (URL) link as the request to initiate the browser to assist in establishing the SSL VPN connection with the server.

10. The method of claim 9, wherein requesting further includes interacting with the user via the browser to authenticate the user to an identity service for the SSL VPN connection.

11. The method of claim 8, wherein supplying further includes receiving from the server a new cookie that is to replace the secret token after the SSL VPN connection is initially established via the secret token.

12. The method of claim 11, wherein receiving further includes supplying the new cookie for each communication with the server during the SSL VPN connection.

13. The method of claim 8, wherein shutting down further includes shutting down the browser based on a manual instruction from a user to close the browser.

14. The method of claim 8, wherein shutting down further includes automatically shutting down the browser once the SSL VPN connection is established via the secret token.

15. A multiprocessor-implemented system, comprising:
   a non-browser application implemented in a computer-readable medium and to execute on a client of a network; and
   a server to execute over the network and interact with the client;
   wherein the non-browser application is configured to interact with a browser to establish a secure communication session with the server over the network, the browser acts as an intermediary to initially establish the secure communication session and the secure communication session uses encryption, the browser acts as an intermediary by acquiring a secret token from the server and supplying the secret token to the non-browser application and then the browser shuts down, the non-browser application includes an interface to interact with the browser but does not require the browser and is not embedded within the browser, the server configured to interact with the browser to set a session cookie for the secure communication session and provide the secret token to the non-browser application via the browser that maps to the session cookie, the non-browser application further configured to resupply the secret token to the server independent from the browser to initiate the secure communication session with the server and the browser closed thereafter while the secure communication session continues between the non-browser application and the server, the server dynamically translates the secret token into the session cookie when the session cookie is no longer available from the bowser that is closed and the secure communication session continues unabated via the secret token that the server translates back to the session cookie, the secret token is supplied to the sever independent of the browser and without the presence of the browser.

16. The system of claim 15, wherein the secure communication session is a secure socket layer (SSL) virtual private network (VPN) session with a secure communication tunnel established between the non-browser application and the server.

17. The system of claim 15, wherein the server is configured to redirect the browser to an identity service to authenticate a user of the non-browser application for the secure communication session.

18. The system of claim 15, wherein the server is configured to direct the browser to set the session cookie within the browser.

19. The system of claim 15, wherein the server is configured to direct the non-browser application to replace the secret token with a new session cookie after the secret token is supplied at least once from the non-browser application, the non-browser application further instructed to supply the new session cookie with all communication during the secure communication session with the server.

20. The system of claim 15, wherein the non-browser application is configured to close the browser once the secure communication session is established.

* * * * *

UNITED STATES PATENT AND TRADEMARK OFFICE
CERTIFICATE OF CORRECTION

PATENT NO.        : 8,799,640 B2                                        Page 1 of 1
APPLICATION NO.   : 12/714451
DATED             : August 5, 2014
INVENTOR(S)       : Mukkara et al.

It is certified that error appears in the above-identified patent and that said Letters Patent is hereby corrected as shown below:

In the Claims

In column 8, line 40, in Claim 1, delete "a" and insert --the--, therefor

In column 8, line 45, in Claim 1, after "by", insert --dynamically--, therefor

In column 8, line 48, in Claim 1, before "by", insert --to the server--, therefor In column 9, line 28, in Claim 8, before "SSL", insert --the--, therefor In column 10, line 26, in Claim 15, after "token", insert --back--, therefor In column 10, line 37, in Claim 15, delete "sever" and insert --server--, therefor Signed and Sealed this
Eleventh Day of November, 2014

Michelle K. Lee
*Deputy Director of the United States Patent and Trademark Office*